United States Patent
Mizoguchi et al.

(10) Patent No.: US 11,735,742 B2
(45) Date of Patent: Aug. 22, 2023

(54) LEAD-ACID BATTERY

(71) Applicant: GS Yuasa International Ltd., Kyoto (JP)

(72) Inventors: Yasunori Mizoguchi, Kyoto (JP); Hiroki Kagohashi, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 0 days.

(21) Appl. No.: 17/608,870

(22) PCT Filed: May 29, 2020

(86) PCT No.: PCT/JP2020/021480
§ 371 (c)(1),
(2) Date: Nov. 4, 2021

(87) PCT Pub. No.: WO2020/241883
PCT Pub. Date: Dec. 3, 2020

(65) Prior Publication Data
US 2022/0328844 A1 Oct. 13, 2022

(30) Foreign Application Priority Data

May 31, 2019 (JP) .................................. 2019-103303

(51) Int. Cl.
*H01M 4/73* (2006.01)
*H01M 4/68* (2006.01)
(Continued)

(52) U.S. Cl.
CPC .............. *H01M 4/68* (2013.01); *H01M 4/14* (2013.01); *H01M 10/06* (2013.01)

(58) Field of Classification Search
CPC ........ H01M 4/73; H01M 4/667; H01M 4/685; H01M 4/70; H01M 10/06; Y02E 60/10
See application file for complete search history.

(56) References Cited

U.S. PATENT DOCUMENTS

| 4,548,835 A | 10/1985 | Takahashi et al. |
| 2003/0235763 A1* | 12/2003 | Gonzalez ................ H01M 4/73 427/126.3 |

(Continued)

FOREIGN PATENT DOCUMENTS

| JP | 51-47237 A | 4/1976 |
| JP | 55-39158 A | 3/1980 |

(Continued)

OTHER PUBLICATIONS

International Search Report (ISR) dated Aug. 18, 2020 filed in PCT/JP2020/021480.

*Primary Examiner* — Cynthia H Kelly
*Assistant Examiner* — Monique M Wills
(74) *Attorney, Agent, or Firm* — Rankin, Hill & Clark LLP

(57) ABSTRACT

A lead-acid battery includes a positive electrode plate, a negative electrode plate, an electrolyte solution, and a polymer compound, in which the positive electrode plate includes a positive current collector and a positive electrode material, the negative electrode plate includes a negative current collector and a negative electrode material, the Ca content of the positive current collector is 0.13% by mass or less, and the polymer compound has a peak in a range of 3.2 ppm or more and 3.8 ppm or less in a chemical shift of $^1$H-NMR spectrum, or the polymer compound contains a repeating structure of oxy $C_{2-4}$ alkylene units.

16 Claims, 3 Drawing Sheets

(51) Int. Cl.
    *H01M 4/14*     (2006.01)
    *H01M 10/06*     (2006.01)

(56) References Cited

U.S. PATENT DOCUMENTS

| | | |
|---|---|---|
| 2006/0269801 A1 | 11/2006 | Honbo et al. |
| 2011/0020693 A1 | 1/2011 | Hoshiba |
| 2011/0177392 A1 | 7/2011 | Hoshiba |
| 2013/0157118 A1 | 6/2013 | Shibahara et al. |
| 2014/0356729 A1 | 12/2014 | Fitter |
| 2015/0200389 A1 | 7/2015 | Fitter |
| 2016/0118694 A1 | 4/2016 | Fitter |
| 2016/0254570 A1 | 9/2016 | Matsumura |
| 2017/0194649 A1 | 7/2017 | Huusken |
| 2018/0047989 A1 | 2/2018 | Korzhenko et al. |
| 2018/0053939 A1 | 2/2018 | Korzhenko et al. |
| 2018/0261888 A1 | 9/2018 | Fitter |

FOREIGN PATENT DOCUMENTS

| | | |
|---|---|---|
| JP | 55-93675 A | 7/1980 |
| JP | 55-95272 A | 7/1980 |
| JP | 56-24762 A | 3/1981 |
| JP | 56-52875 A | 5/1981 |
| JP | 58-14463 A | 1/1983 |
| JP | 58-19863 A | 2/1983 |
| JP | 58-154171 A | 9/1983 |
| JP | 60-30063 A | 2/1985 |
| JP | 60-182662 A | 9/1985 |
| JP | 6-60881 A | 3/1994 |
| JP | 8-83621 A | 3/1996 |
| JP | 2000-149980 A | 5/2000 |
| JP | 2000-149981 A | 5/2000 |
| JP | 2002-198085 A | 7/2002 |
| JP | 2003-151618 A | 5/2003 |
| JP | 2006-196191 A | 7/2006 |
| JP | 2007-12596 A | 1/2007 |
| JP | 2011-181312 A | 9/2011 |
| JP | 2012-9775 A | 1/2012 |
| JP | 2015-219973 A | 12/2015 |
| JP | 2015-219974 A | 12/2015 |
| JP | 2015-220046 A | 12/2015 |
| JP | 2016-54091 A | 4/2016 |
| JP | 2016-54092 A | 4/2016 |
| JP | 2016-524288 A | 8/2016 |
| JP | 2017-525092 A | 8/2017 |
| JP | 2017-162754 A | 9/2017 |
| JP | 2018-508633 A | 3/2018 |
| JP | 2018-508961 A | 3/2018 |
| WO | 2009/119582 A1 | 10/2009 |
| WO | 2010/032785 A1 | 3/2010 |
| WO | 2012/042917 A1 | 4/2012 |
| WO | 2013/073420 A1 | 5/2013 |
| WO | 2015/056417 A1 | 4/2015 |

\* cited by examiner

LEAD-ACID BATTERY

TECHNICAL FIELD

The present invention relates to a lead-acid battery.

BACKGROUND ART

Lead-acid batteries are used for various applications, including automotive and industrial applications. The lead-acid batteries include a negative electrode plate, a positive electrode plate, a separator (or mat), an electrolyte solution, and the like. An additive may be added to constituent members of the lead-acid battery from the viewpoint of imparting various functions.

Patent Document 1 proposes a lead-acid battery in which a copolymer of propylene oxide and ethylene oxide was added to a negative electrode plate active material in combination with lignin sulfonate.

Patent Document 2 proposes a lead-acid battery in which an activator containing an organic polymer is enclosed in a small sealed case having a cleavage mechanism into a container, and the small sealed case is attached to the container or a lid part.

Patent Document 3 proposes a fiber-attached mat containing a plurality of fibers coated with a size composition, a binder composition, and one or more additives, in which the additives include one or more of rubber additives, rubber derivatives, aldehydes, metal salts, ethylene-propylene oxide block copolymers, sulfuric acid esters, sulfonic acid esters, phosphoric acid esters, polyacrylic acid, polyvinyl alcohol, lignin, phenol formaldehyde resins, cellulose, wood flour, and the like, and the additives can function to reduce moisture loss in a lead-acid battery.

On the other hand, Patent Document 4 proposes a valve regulated lead-acid battery including a positive current collector and a positive active material, a negative current collector and a negative active material, and a liquid holding body, in which the positive current collector is a punched current collector obtained by punching a rolled sheet of lead alloy, and an average interlayer distance of a layered current collector structure in a cross section of the current collector in a thickness direction is 25 μm or more and 180 μm or less, the positive current collector is made of a Pb—Ca—Sn alloy, and when a Ca content is x and a Sn content is y in % by mass units, 0.03<x≤0.09 and 9.16x+0.525≤y≤2.0 are satisfied.

PRIOR ART DOCUMENTS

Patent Documents

Patent Document 1: JP-A-1985-182662
Patent Document 2: JP-A-2000-149980
Patent Document 3: JP-W-2017-525092
Patent Document 4: WO 2015/056417 A

SUMMARY OF THE INVENTION

Problems to be Solved by the Invention

In a lead-acid battery, corrosion resistance of a positive current collector has a great influence on life during float charging. For example, when a lead-acid battery is used for a backup power supply, since the standby lead-acid battery is continuously charged at a constant voltage, the positive electrode is likely to be exposed to a noble potential, and corrosion of the positive current collector is likely to proceed.

Here, it is considered that when the corrosion resistance of the positive current collector is enhanced, a significant improvement in battery life during float charging can be expected. However, in practice, even if the corrosion resistance of the positive current collector is improved, influence of decrease in the amount of an electrolyte solution becomes apparent, and it is difficult to significantly improve the battery life. In particular, in the case of a valve regulated lead-acid battery, before the corrosion of the positive current collector reaches a level of the battery life, contact failure between an electrode plate and an electrolyte solution is likely to occur due to decrease in the amount of the electrolyte solution, and battery capacity may decrease and the battery may reach the life.

As described above, in the lead-acid battery, it has been considered that the improvement in corrosion resistance of the positive current collector affects the life during float charging, but in practice, it is meaningful to achieve a balance between the corrosion resistance of the positive current collector and suppression of the decrease in the amount of the electrolyte solution.

Means for Solving the Problems

One aspect of the present invention relates to a lead-acid battery including a positive electrode plate, a negative electrode plate, an electrolyte solution, and a polymer compound, in which the positive electrode plate includes a positive current collector and a positive electrode material, the negative electrode plate includes a negative current collector and a negative electrode material, the Ca content of the positive current collector is 0.13% by mass or less, and the polymer compound has a peak in a range of 3.2 ppm or more and 3.8 ppm or less in a chemical shift of $^1$H-NMR spectrum.

Another aspect of the present invention relates to a lead-acid battery including a positive electrode plate, a negative electrode plate, an electrolyte solution, and a polymer compound, in which the positive electrode plate includes a positive current collector and a positive electrode material, the negative electrode plate includes a negative current collector and a negative electrode material, the Ca content of the positive current collector is 0.13% by mass or less, and the polymer compound contains a repeating structure of oxy $C_{2-4}$ alkylene units.

Advantages of the Invention

The life of the lead-acid battery during float charging is improved.

MODE FOR CARRYING OUT THE INVENTION

[Lead-Acid Battery]

Figure 1:
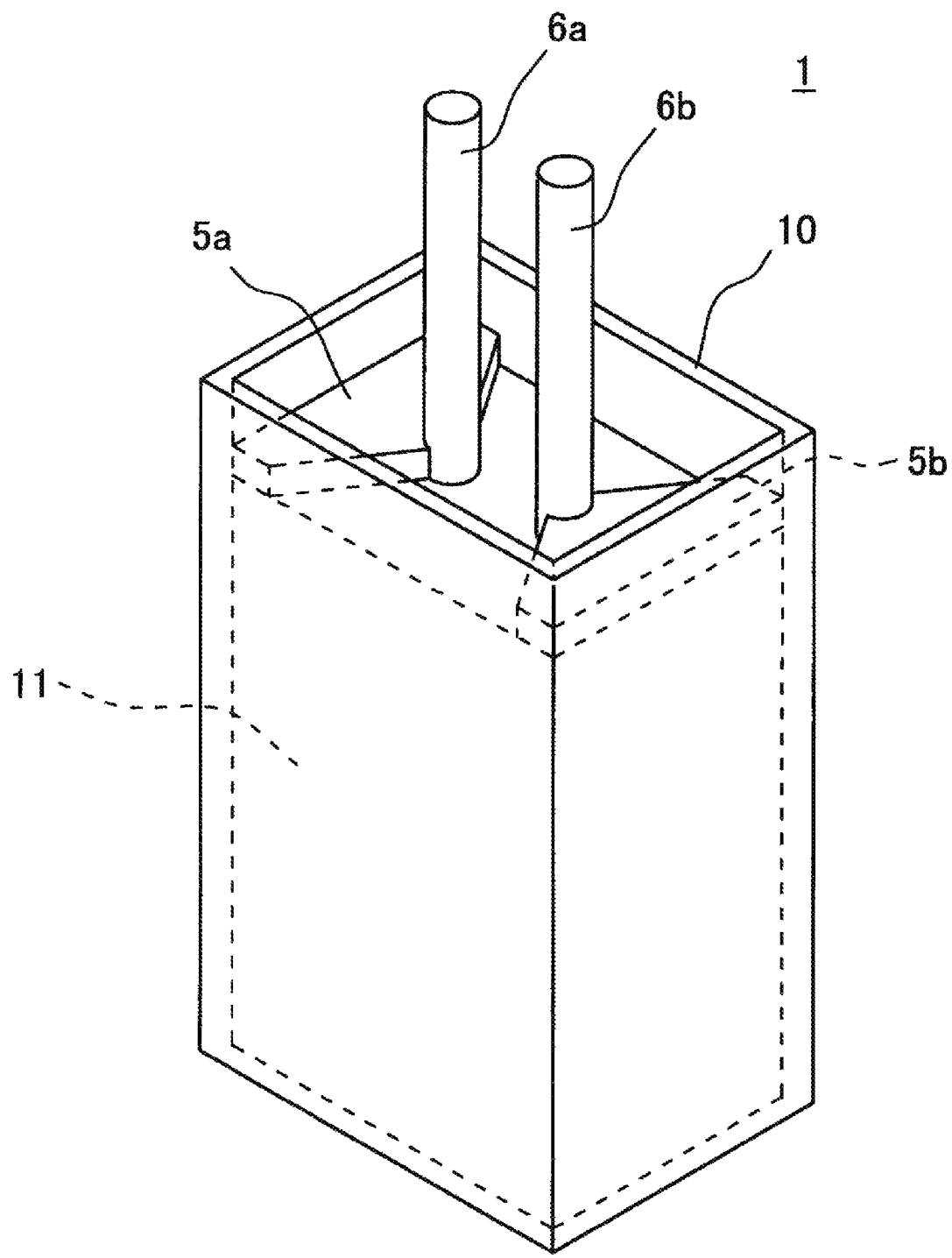
FIG. 1 is a perspective view schematically showing a state in which a lid of a lead-acid battery according to one aspect of the present invention is removed.

A lead-acid battery according to an embodiment of the present invention includes a positive electrode plate, a negative electrode plate, an electrolyte solution, and a polymer compound. The positive electrode plate includes a positive current collector and a positive electrode material. The negative electrode plate includes a negative current collector and a negative electrode material. Here, the Ca content of the positive current collector is 0.13% by mass or less.

The polymer compound has a peak in a range of 3.2 ppm or more and 3.8 ppm or less in a chemical shift of $^1$H-NMR spectrum. Alternatively, the polymer compound contains a repeating structure of oxy $C_{2-4}$ alkylene units. Note that the peak appearing in the range of 3.2 ppm or more and 3.8 ppm or less in the $^1$H-NMR spectrum is derived from an oxy $C_{2-4}$ alkylene unit. Hereinafter, these polymer compounds are simply collectively referred to as "polymer compounds". Here, the $^1$H-NMR spectrum is measured using deuterated chloroform as a solvent.

When the Ca content of the positive current collector is 0.13% by mass or less and the lead-acid battery contains a polymer compound, the battery life during float charging is remarkably improved.

Such remarkable improvement in durability is considered to be due to the following mechanism.

First, the polymer compound has an effect of increasing a hydrogen overvoltage in the negative electrode plate and suppressing a decomposition reaction of water during float charging. In addition, as the hydrogen overvoltage of the negative electrode plate increases, the positive electrode potential during float charging shifts to low. Therefore, it is advantageous for suppressing corrosion of the positive current collector. In addition, when the Ca content of the positive current collector is 0.13% by mass, corrosion of the positive current collector is further suppressed. Here, the reason why the battery life during float charging is remarkably improved is presumed to be that the influence of corrosion of the positive current collector is reduced and the influence of decrease in the amount of the electrolyte solution is relatively increased among the influences on the battery life. For example, in a valve regulated lead-acid battery, the decrease in the amount of the electrolyte solution usually progresses slowly. In addition, due to the presence of the polymer compound, the decomposition reaction of water in the negative electrode plate is suppressed, so that the decrease in the amount of the electrolyte solution is more gradual. As described above, it is considered that the battery life mainly caused by the decrease in the amount of the electrolyte solution is not easily achieved. That is, even when the same positive electrode plate is used, the life of the lead-acid battery containing a polymer compound is remarkably improved as compared with a lead-acid battery not containing a polymer compound.

As the Ca content of the positive current collector is reduced, the corrosion resistance of the positive current collector tends to be improved. In particular, when the Ca content of the positive current collector is 0.07% by mass or less, a synergistic effect of improving the corrosion resistance of the positive current collector and suppressing the decrease in the amount of the electrolyte solution due to the polymer compound is enhanced, and the battery life is greatly improved. When the polymer compound is used and the Ca content of the positive current collector is less than 0.01% by mass, the battery life is further greatly improved.

It is considered that when the Ca content of the positive current collector is less than 0.01% by mass, corrosion originating from grain boundaries of metal crystal grains (so-called grain boundary corrosion) is less likely to proceed, so that the effect of improving the battery life becomes remarkable.

In a region where the Ca content of the positive current collector is 0.13% by mass or less, improvement in corrosion resistance of the positive current collector by reducing the Ca content is not so remarkable. Nevertheless, improvement in life during float charging is remarkable. The reason is not clear, but it is considered that influence of the polymer compound becomes more remarkable. When the positive current collector having a Ca content of more than 0.13% by mass is used, the influence of the corrosion of the positive current collector is very large among the influences on the battery life, and the effect of improving the life is not observed even when the polymer compound is used.

When the positive current collector contains Ca, from the viewpoint of improving the corrosion resistance of the positive current collector, the positive current collector or a lead alloy constituting the positive current collector may further contain Sn, and may be composed of, for example, a Pb—Ca—Sn alloy. The positive current collector may contain Sn, but when the Ca content is 0.13% by mass or less, the Sn content is desirably 3.0% by mass or less. Also, when the Ca content is less than 0.01% by mass, the Sn content is preferably 0.5% by mass or less, and more preferably less than 0.01% by mass.

Hereinafter, an action of the polymer compound on the negative electrode plate will be further described in detail.

In a lead-acid battery, the decomposition reaction of water is greatly affected by a reductive reaction of hydrogen ions at an interface between lead and an electrolyte solution. The reason why the decomposition reaction of water is reduced is considered to be that the surface of lead which is a negative active material is covered with the polymer compound, so that the hydrogen overvoltage increases, and a side reaction in which hydrogen is generated from protons at the time of overcharge is inhibited. Therefore, in order to enhance the effect of suppressing the decomposition reaction of water during float charging, the polymer compound is preferably contained at least in the negative electrode material.

However, the polymer compound easily takes a linear structure by having oxy $C_{2-4}$ alkylene units, and thus it is expected that the polymer compound hardly remains in the negative electrode material and easily diffuses into the electrolyte solution. However, in practice, even when the negative electrode material contains a very small amount of a polymer compound, an effect of reducing the decomposition reaction of water during float charging is obtained. When the polymer compound is contained in the negative electrode material and is present in the vicinity of lead, it is considered that the oxy $C_{2-4}$ alkylene unit exhibits a high adsorption action on lead.

The polymer compound contained in the negative electrode material exhibits an effect of reducing the decomposition reaction of water during float charging even in a very small amount. This suggests that the polymer compound spreads thinly on the lead surface and suppresses the reductive reaction of hydrogen ions in a wide region of the lead surface. This does not contradict that the polymer compound easily takes a linear structure. Since suppression of the decomposition reaction of water during float charging can reduce liquid decrease, it is advantageous for prolonging the life of the lead-acid battery.

In general, in a storage battery, since a sulfuric acid aqueous solution is used as an electrolyte solution, when an organic additive (oil, polymer, organic expander, or the like) is contained in a negative electrode material, it becomes difficult to balance elution into the electrolyte solution and adsorption to lead. For example, when an organic additive having low adsorptivity to lead is used, elution into the electrolyte solution becomes easy. On the other hand, when an organic additive having high adsorptivity to lead is used, it is difficult to thinly adhere the organic additive to the lead surface, and the organic additive tends to be unevenly distributed in the lead pores.

In the lead-acid battery according to the present invention, the polymer compound may contain an oxygen atom bonded to a terminal group and a —$CH_2$— group and/or a —CH< group bonded to the oxygen atom. In the $^1$H-NMR spectrum, a ratio of an integrated value of the peak of 3.2 ppm to 3.8 ppm to the sum of the integrated value of this peak, an integrated value of a peak of hydrogen atoms of the —$CH_2$— group bonded to the oxygen atom, and an integrated value of a peak of a hydrogen atom of the —CH< group bonded to the oxygen atom is preferably 85% or more. Such polymer compounds contain many oxy $C_{2-4}$ alkylene units in the molecule. Therefore, it is considered that it becomes easy to adsorb to lead, and it becomes easy to thinly cover the lead surface by easily taking a linear structure.

In the $^1$H-NMR spectrum, the polymer compound having a peak in the chemical shift range of 3.2 ppm to 3.8 ppm preferably contains a repeating structure of oxy $C_{2-4}$ alkylene units. When a polymer compound containing a repeating structure of oxy $C_{2-4}$ alkylene units is used, it is considered it becomes easier to adsorb to lead, and it becomes easy to thinly cover the lead surface by easily taking a linear structure.

In the present specification, the polymer compound refers to a compound having a repeating unit of oxy $C_{2-4}$ alkylene units and/or having a number average molecular weight (Mn) of 500 or more.

Note that the oxy $C_{2-4}$ alkylene unit is a unit represented by —O—$R^1$— ($R^1$ represents a $C_{2-4}$ alkylene group.).

The polymer compound may contain at least one selected from the group consisting of etherified products of a hydroxy compound having a repeating structure of oxy $C_{2-4}$ alkylene units and esterified products of a hydroxy compound having a repeating structure of oxy $C_{2-4}$ alkylene units. Here, the hydroxy compound is at least one selected from the group consisting of poly $C_{2-4}$ alkylene glycols, copolymers containing a repeating structure of oxy $C_{2-4}$ alkylene, and $C_{2-4}$ alkylene oxide adducts of a polyol. When such a polymer compound is used, the decomposition reaction of water during float charging can be further suppressed, and a high liquid decrease suppressing effect is obtained.

The repeating structure of oxy $C_{2-4}$ alkylene units may contain at least a repeating structure of oxypropylene units (—O—CH(—$CH_3$)—$CH_2$—). Such a polymer compound easily spreads thinly on a lead surface while having high adsorptivity to lead, and is considered to have an excellent balance therebetween. Therefore, the effect of suppressing the decomposition reaction of water during float charging is enhanced.

As described above, since the polymer compound can thinly cover the lead surface while having high adsorptivity to lead, even if the content of the polymer compound in the negative electrode material is small, the reductive reaction of hydrogen ions can be suppressed in a wide region of the lead surface.

From the viewpoint of securing a longer battery life, the content of the polymer compound in the negative electrode material is preferably set to 5 ppm or more, and may be 15 ppm or more, in mass ratio (i.e., mass basis). However, when the content of the polymer compound in the negative electrode material is excessive and charge current falls below a self-discharge rate of the positive electrode material, lead sulfate accumulates in the positive electrode plate during long-term use, discharge capacity may decrease, and the battery may reach the life. Therefore, the content of the polymer compound in the negative electrode material is desirably 400 ppm or less, and may be 250 ppm or less in mass ratio.

The content of the polymer compound in the negative electrode material is desirably 5 ppm or more and 400 ppm or less in mass ratio, and may be 5 ppm or more and 250 ppm or less, 15 ppm or more and 400 ppm or less, or 15 ppm or more and 250 ppm or less.

The polymer compound may be contained in the electrolyte solution. The concentration of the polymer compound in the electrolyte solution may be, for example, 500 ppm or less, more than 8 ppm and 400 ppm or less, or 15 ppm or more and 360 ppm or less in mass ratio. Even when the electrolyte solution contains a polymer compound, by controlling the Ca content of the positive current collector to 0.13% by mass or less, an effect of improving the life during float charging is obtained.

The polymer compound preferably contains a compound having at least Mn of 500 or more. In this case, in addition to the fact that the polymer compound tends to remain in the negative electrode material, adsorptivity to lead is enhanced, the effect of suppressing the reductive reaction of hydrogen ions is further enhanced, and structural change of the negative active material caused by collision of hydrogen gas with the negative electrode material can also be suppressed.

The polymer compound is preferably contained in the negative electrode material, but may be contained in any of the components (for example, a negative electrode plate, a positive electrode plate, an electrolyte solution, and/or a separator, and the like) of the lead-acid battery when preparing the lead-acid battery. The polymer compound may be contained in one component, or may be contained in two or more components (for example, a negative electrode plate, an electrolyte solution, and the like).

The content of the polymer compound in the negative electrode material and the concentration of the polymer compound in the electrolyte solution are determined for a lead-acid battery in a fully charged state.

The lead-acid battery may be either a valve regulated (sealed) lead-acid battery or a flooded-type (vented type) lead-acid battery.

In the present specification, the fully charged state of the flooded-type lead-acid battery is defined by the definition of JIS D 5301: 2006. More specifically, the following state is defined as a fully charged state: the lead-acid battery is charged at a current (A) 0.2 times as large as a numerical value described as a rated capacity (Ah) until a terminal voltage during charge measured every 15 minutes or an electrolyte solution density subjected to temperature correction to 20° C. exhibits a constant value at three significant digits continuously three times. Also, in the case of a valve regulated lead-acid battery, the fully charged state is a state where the lead-acid battery is subjected to constant current constant voltage charge of 2.23 V/cell at a current (A) 0.2 times as large as the numerical value described as the rated capacity (Ah) in an air tank of 25° C.±2° C., and the charge is completed when the charge current during constant voltage charge becomes 0.005 times as large as the numerical value described as the rated capacity (Ah). Note that the numerical value described as the rated capacity is a numerical value in which the unit is Ah. The unit of the current set based on the numerical value indicated as the rated capacity is A.

The lead-acid battery in the fully charged state refers to a battery obtained by fully charging a formed lead-acid battery. The full charge of the lead-acid battery may be performed immediately after formation so long as being performed after formation or may be performed after the lapse of time from formation (e.g., a lead-acid battery in use (preferably at the initial stage of use) after formation may be fully charged). The battery at the initial stage of use refers to a battery that has not been used for a long time and has hardly deteriorated.

In the present specification, the number average molecular weight Mn is determined by gel permeation chromatography (GPC). A standard substance used for determining Mn is polyethylene glycol.

Hereinafter, the lead-acid battery according to an embodiment of the present invention will be described for each of the main constituent elements, but the present invention is not limited to the following embodiment.

[Lead-Acid Battery]
(Negative Electrode Plate)

The negative electrode plate usually includes a negative current collector in addition to a negative electrode material. The negative electrode material is obtained by removing the negative current collector from the negative electrode plate. Note that a member such as a mat or a pasting paper may be stuck to the negative electrode plate. Such a member (sticking member) is used integrally with the negative electrode plate and is thus assumed to be included in the negative electrode plate. Also, when the negative electrode plate includes such a member, the negative electrode material excludes the negative current collector and the sticking member.

The negative current collector may be formed by casting lead (Pb) or a lead alloy, or may be formed by processing a lead sheet or a lead alloy sheet. Examples of the processing method include expanding processing and punching processing. It is preferable to use a negative grid as the negative current collector because the negative electrode material is easily supported.

The lead alloy used for the negative current collector may be any of a Pb—Sb-based alloy, a Pb—Ca-based alloy, and a Pb—Ca—Sn-based alloy. The lead or lead alloys may further contain, as an additive element, at least one selected from the group consisting of Ba, Ag, Al, Bi, As, Se, Cu, and the like. The negative current collector may include a surface layer. The surface layer and the inner layer of the negative current collector may have different compositions. The surface layer may be formed in the lug of the negative current collector. The surface layer of the lug may contain Sn or an Sn alloy.

The negative electrode plate can be formed in such a manner that a negative current collector is coated or filled with a negative electrode paste, which is then cured and dried to prepare a non-formed negative electrode plate, and thereafter, the non-formed negative electrode plate is formed. The negative electrode paste is prepared by adding water and sulfuric acid to lead powder and an organic expander, and various additives as necessary, and kneading the mixture. At the time of curing, it is preferable to cure the non-formed negative electrode plate at a higher temperature than room temperature and high humidity.

The negative electrode material contains the above polymer compound. The negative electrode material further contains a negative active material (lead or lead sulfate) that exhibits a capacity through a redox reaction. The negative electrode material may contain an expander, a carbonaceous material, and/or other additives. Examples of the additive include barium sulfate, fibers (resin fibers and the like), and the like, but are not limited thereto. Note that the negative active material in the charged state is spongy lead, but the non-formed negative electrode plate is usually prepared using lead powder.

(Polymer Compound)

The polymer compound has a peak in a range of 3.2 ppm or more and 3.8 ppm or less in a chemical shift of $^1$H-NMR spectrum. Such polymer compounds have oxy $C_{2-4}$ alkylene units. Examples of the oxy $C_{2-4}$ alkylene unit include an oxyethylene unit, an oxypropylene unit, an oxytrimethylene unit, an oxy 2-methyl-1,3-propylene unit, an oxy 1,4-butylene unit, an oxy 1,3-butylene unit, and the like. The polymer compound may have one kind or two or more kinds of such oxy $C_{2-4}$ alkylene units.

The polymer compound preferably contains a repeating structure of oxy $C_{2-4}$ alkylene units. The repeating structure may contain one kind of oxy $C_{2-4}$ alkylene unit, or may contain two or more kinds of oxy $C_{2-4}$ alkylene units. The polymer compound may contain one kind of the repeating structure or two or more kinds of repeating structures.

Examples of the polymer compound include hydroxy compounds having a repeating structure of oxy $C_{2-4}$ alkylene units (poly $C_{2-4}$ alkylene glycols, copolymers containing a repeating structure of oxy $C_{2-4}$ alkylene, $C_{2-4}$ alkylene oxide adducts of a polyol, and the like), etherified or esterified products of these hydroxy compounds, and the like.

Examples of the copolymer include copolymers containing different oxy $C_{2-4}$ alkylene units, poly $C_{2-4}$ alkylene glycol alkyl ethers, poly $C_{2-4}$ alkylene glycol esters of carboxylic acids, and the like. The copolymer may be a block copolymer.

The polyol may be any of an aliphatic polyol, an alicyclic polyol, an aromatic polyol, a heterocyclic polyol, and the like. From the viewpoint that the polymer compound easily spreads thinly on the lead surface, aliphatic polyols, alicyclic polyols (for example, polyhydroxycyclohexane, polyhydroxynorbornane, and the like), and the like are preferable, and among them, aliphatic polyols are preferable. Examples of the aliphatic polyol include aliphatic diols and polyols of triol or higher (for example, glycerin, trimethylolpropane, pentaerythritol, sugar alcohol, and the like), and the like. Examples of the aliphatic diol include an alkylene glycol having 5 or more carbon atoms. The alkylene glycol may be, for example, a $C_{5-14}$ alkylene glycol or a $C_{5-10}$ alkylene glycol. Examples of the sugar alcohol include erythritol, xylitol, mannitol, sorbitol, and the like. In the alkylene oxide adduct of the polyol, the alkylene oxide corresponds to an oxy $C_{2-4}$ alkylene unit of the polymer compound and contains at least $C_{2-4}$ alkylene oxide. From the viewpoint that the polymer compound easily take a linear structure, the polyol is preferably a diol.

The etherified product has an —$OR^2$ group obtained by etherifying —OH groups (—OH groups composed of a hydrogen atom of a terminal group and an oxygen atom bonded to the hydrogen atom) at at least a part of terminals of the hydroxy compound having the repeating structure of oxy $C_{2-4}$ alkylene units (wherein $R^2$ is an organic group.). Among terminals of the polymer compound, some terminals may be etherified, or all terminals may be etherified. For example, one terminal of a main chain of the linear polymer compound may be an —OH group, and the other terminal may be an —OR² group.

The esterified product has an —O—C(=O)—R³ group obtained by esterifying —OH groups (—OH groups composed of a hydrogen atom of a terminal group and an oxygen atom bonded to the hydrogen atom) at at least a part of terminals of the hydroxy compound having the repeating structure of oxy $C_{2-4}$ alkylene units (wherein R³ is an organic group.). Among terminals of the polymer compound, some terminals may be esterified, or all terminals may be esterified. For example, one terminal of a main chain of the linear polymer compound may be an —OH group, and the other terminal may be an —O—C(=O)—R³ group.

Examples of each of the organic groups R² and R³ include a hydrocarbon group. The hydrocarbon group may have a substituent (for example, a hydroxy group, an alkoxy group, and/or a carboxy group, and the like). The hydrocarbon group may be any of aliphatic, alicyclic, and aromatic. The aromatic hydrocarbon group and the alicyclic hydrocarbon group may have an aliphatic hydrocarbon group (for example, an alkyl group, an alkenyl group, an alkynyl group, or the like) as a substituent. The number of carbon atoms of the aliphatic hydrocarbon group as a substituent may be, for example, 1 to 20, 1 to 10, 1 to 6, or 1 to 4.

Examples of the aromatic hydrocarbon group include aromatic hydrocarbon groups having 24 or less carbon atoms (for example, 6 to 24). The number of carbon atoms of the aromatic hydrocarbon group may be 20 or less (for example, 6 to 20), 14 or less (for example, 6 to 14), or 12 or less (for example, 6 to 12). Examples of the aromatic hydrocarbon group include an aryl group, a bisaryl group, and the like. Examples of the aryl group include a phenyl group, a naphthyl group, and the like. Examples of the bisaryl group include monovalent groups corresponding to bisarene. Examples of the bisarene include biphenyl and bisarylalkanes (for example, bis $C_{6-10}$ aryl $C_{1-4}$ alkanes (such as 2,2-bisphenylpropane), and the like).

Examples of the alicyclic hydrocarbon group include alicyclic hydrocarbon groups having 16 or less carbon atoms. The alicyclic hydrocarbon group may be a bridged cyclic hydrocarbon group. The number of carbon atoms of the alicyclic hydrocarbon group may be 10 or less or 8 or less. The number of carbon atoms of the alicyclic hydrocarbon group is, for example, 5 or more, and may be 6 or more.

The number of carbon atoms of the alicyclic hydrocarbon group may be 5 (or 6) or more and 16 or less, 5 (or 6) or more and 10 or less, or 5 (or 6) or more and 8 or less.

Examples of the alicyclic hydrocarbon group include cycloalkyl groups (cyclopentyl group, cyclohexyl group, cyclooctyl group, and the like), cycloalkenyl groups (cyclohexenyl group, cyclooctenyl group, and the like), and the like. The alicyclic hydrocarbon group also includes hydrogenated products of the aromatic hydrocarbon groups.

Among the hydrocarbon groups, an aliphatic hydrocarbon group is preferable from the viewpoint that the polymer compound easily adheres thinly to the lead surface. Examples of the aliphatic hydrocarbon group include alkyl groups, alkenyl groups, alkynyl groups, dienyl groups, and the like. The aliphatic hydrocarbon group may be either linear or branched.

The number of carbon atoms of the aliphatic hydrocarbon group is, for example, 30 or less, and may be 26 or less or 22 or less, 20 or less or 16 or less, 14 or less or 10 or less, or 8 or less or 6 or less. The lower limit of the number of carbon atoms is 1 or more for an alkyl group, 2 or more for an alkenyl group and an alkynyl group, and 3 or more for a dienyl group, depending on the type of the aliphatic hydrocarbon group. Among them, an alkyl group and an alkenyl group are preferable from the viewpoint that the polymer compound easily adheres thinly to the lead surface.

Specific examples of the alkyl group include methyl, ethyl, n-propyl, i-propyl, n-butyl, i-butyl, s-butyl, t-butyl, n-pentyl, neopentyl, i-pentyl, s-pentyl, 3-pentyl, t-pentyl, n-hexyl, 2-ethylhexyl, n-octyl, n-decyl, i-decyl, lauryl, myristyl, cetyl, stearyl, behenyl, and the like.

Specific examples of the alkenyl group include vinyl, 1-propenyl, allyl, palmitoleyl, oleyl, and the like. An alkenyl group may be, for example, a $C_{2-30}$ alkenyl group or a $C_{2-26}$ alkenyl group, a $C_{2-22}$ alkenyl group or a $C_{2-20}$ alkenyl group, or a $C_{10-20}$ alkenyl group.

When an etherified product of a hydroxy compound having a repeating structure of oxy $C_{2-4}$ alkylene units and/or an esterified product of a hydroxy compound having a repeating structure of oxy $C_{2-4}$ alkylene units are used among the polymer compounds, a higher liquid decrease suppressing effect can be secured.

The negative electrode material may contain one kind or two or more kinds of polymer compounds.

From the viewpoint of further enhancing the battery life during float charging at a high temperature, it is preferable that the repeating structure of oxy $C_{2-4}$ alkylene contains at least a repeating structure of oxypropylene units. The polymer compound containing the oxypropylene unit has peaks derived from —CH< and —CH₂— of the oxypropylene unit in a range of 3.2 ppm to 3.8 ppm in a chemical shift of ¹H-NMR spectrum. Since electron densities around a nucleus of a hydrogen atom in these groups are different, the peak is split. Such a polymer compound has peaks, for example, in a range of 3.2 ppm or more and 3.42 ppm or less and a range of more than 3.42 ppm and 3.8 ppm or less in a chemical shift of ¹H-NMR spectrum. The peak in the range of 3.2 ppm or more and 3.42 ppm or less is derived from —CH₂—, and the peak in the range of more than 3.42 ppm and 3.8 ppm or less is derived from —CH< and —CH₂—.

Examples of such a polymer compound include polypropylene glycol, a copolymer containing a repeating structure of oxypropylene, a propylene oxide adduct of the polyol, etherified or esterified products thereof, and the like. Examples of the copolymer include oxypropylene-oxyalkylene copolymers (provided that the oxyalkylene is a $C_{2-4}$ alkylene other than oxypropylene), polypropylene glycol alkyl ethers, a polypropylene glycol ester of a carboxylic acid, and the like. Examples of the oxypropylene-oxyalkylene copolymer include an oxypropylene-oxyethylene copolymer, an oxypropylene-oxytrimethylene copolymer, and the like. The oxypropylene-oxyalkylene copolymer may be a block copolymer.

In the polymer compound containing a repeating structure of oxypropylene, the proportion of the oxypropylene unit is, for example, 5 mol % or more, and may be 10 mol % or more or 20 mol % or more.

It is preferable that the polymer compound contains a large amount of oxy $C_{2-4}$ alkylene units from the viewpoint of enhancing adsorptivity to lead and easily taking a linear structure. Such a polymer compound includes, for example, an oxygen atom bonded to a terminal group and a —CH₂— group and/or a —CH< group bonded to the oxygen atom. In the ¹H-NMR spectrum of the polymer compound, the ratio of the integrated value of the peak of 3.2 ppm to 3.8 ppm to the sum of the integrated value of this peak, the integrated value of the peak of the hydrogen atoms of the —CH₂— group, and the integrated value of the peak of the hydrogen atom of the —CH< group increases. This ratio is, for example, 50% or more, may be 85% or more, and is more preferably 90% or more. For example, when the polymer compound has an —OH group at a terminal and also has a —CH$_2$— group or a —CH< group bonded to an oxygen atom of the —OH group, in the $^1$H-NMR spectrum, the peaks of the hydrogen atoms of the —CH$_2$— group and the —CH< group have a chemical shift in a range of more than 3.8 ppm and 4.0 ppm or less.

The polymer compound may contain a compound having Mn of 500 or more, a compound having Mn of 600 or more, or a compound having Mn of 1000 or more. Mn of such a compound is, for example, 20000 or less, and may be 15000 or less or 10000 or less. The Mn of the compound is preferably 5000 or less and may be 4000 or less or 3500 or less, from the viewpoint of easily retaining the polymer compound in the negative electrode material and easily spreading the polymer compound thinner on the lead surface.

The Mn of the compound may be 500 or more (or 600 or more) and 20,000 or less, 500 or more (or 600 or more) and 15000 or less, 500 or more (or 600 or more) and 10000 or less, 500 or more (or 600 or more) and 5000 or less, 500 or more (or 600 or more) and 4000 or less, 500 or more (or 600 or more) and 3500 or less, 1000 or more and 20000 or less (or 15000 or less), 1000 or more and 10000 or less (or 5000 or less), or 1000 or more and 4000 or less (or 3500 or less).

The polymer compound preferably contains at least a compound having Mn of 1000 or more. Mn of such a compound may be 1000 or more and 20,000 or less, 1000 or more and 15000 or less, or 1000 or more and 10,000 or less. The Mn of the compound is preferably 1000 or more and 5000 or less, and may be 1000 or more and 4000 or less, or 1000 or more and 3500 or less, from the viewpoint of easily retaining the compound in the negative electrode material and easily spreading thinly to the lead surface. When a compound having such Mn is used, the battery life during float charging in a high-temperature environment can be more remarkably improved. As the polymer compound, two or more compounds having different Mn may be used. That is, the polymer compound may have a plurality of peaks of Mn in the distribution of the molecular weight.

The content of the polymer compound in the negative electrode material may be, for example, 5 ppm or more and may be 50 ppm or more on a mass basis. When the content of the polymer compound is in such a range, hydrogen generation voltage can be more easily increased, and an effect of reducing an amount of overcharge can be further enhanced. The content (mass basis) of the polymer compound in the negative electrode material is, for example, 400 ppm or less, and may be 360 ppm or less, 350 ppm or less, or 250 ppm or less. When the content of the polymer compound is 400 ppm or less, the surface of lead is suppressed from being excessively covered with the polymer compound. These lower limit values and upper limit values can be combined arbitrarily.

(Expander)

The negative electrode material can contain an expander. As the expander, an organic expander is preferable. As the organic expander, lignins and/or a synthetic organic expander may be used. Examples of the lignins include lignin, lignin derivatives, and the like. Examples of the lignin derivative include lignin sulfonic acid or salts thereof (such as alkali metal salts (sodium salts and the like)), and the like. The organic expanders are generally roughly classified into lignins and synthetic organic expanders. It can also be said that the synthetic organic expander is an organic expander other than lignins. The synthetic organic expander is an organic polymer containing sulfur element, and generally contains a plurality of aromatic rings in the molecule and sulfur element as a sulfur-containing group. Among the sulfur-containing groups, a sulfonic acid group or a sulfonyl group which is in a stable form is preferable. The sulfonic acid group may exist in an acid form, or may exist in a salt form like a Na salt. The negative electrode material may contain one kind or two or more kinds of expanders.

As the organic expander, it is preferable to use a condensate containing at least a unit of an aromatic compound. Examples of such a condensate include a condensate of an aromatic compound with an aldehyde compound (aldehydes (for example, formaldehyde) and/or condensates thereof, and the like). The organic expander may contain a unit of one kind of an aromatic compound or a unit of two or more kinds of aromatic compounds.

Note that the unit of an aromatic compound refers to a unit derived from an aromatic compound incorporated in a condensate.

As the organic expander, one synthesized by a known method may be used, or a commercially available product may be used. The condensate containing a unit of an aromatic compound is obtained, for example, by reacting an aromatic compound with an aldehyde compound. For example, by performing this reaction in the presence of a sulfite or using an aromatic compound containing sulfur element (for example, bisphenol S or the like), an organic expander containing sulfur element can be obtained. For example, the sulfur element content in the organic expander can be adjusted by adjusting the amount of sulfite and/or the amount of the aromatic compound containing sulfur element. Also when other raw materials are used, the condensate containing a unit of an aromatic compound can be obtained according to this method.

Examples of the aromatic ring of the aromatic compound include a benzene ring, a naphthalene ring, and the like. When the aromatic compound has a plurality of aromatic rings, the plurality of aromatic rings may be linked by a direct bond, a linking group (for example, an alkylene group (including an alkylidene group), a sulfone group, and the like), or the like. Examples of such a structure include bisarene structures (biphenyl, bisphenylalkane, bisphenylsulfone, and the like). Examples of the aromatic compound include compounds having the aromatic ring and a hydroxy group and/or an amino group. The hydroxy group or the amino group may be directly bonded to the aromatic ring, or may be bonded as an alkyl chain having a hydroxy group or an amino group. Note that the hydroxy group also includes salts of hydroxy group (—OMe). The amino group also includes salts of amino group (salts with anion). Examples of Me include alkali metals (Li, K, Na, and the like), Group 2 metals of the periodic table (Ca, Mg, and the like), and the like.

As the aromatic compound, bisarene compounds (bisphenol compounds, hydroxybiphenyl compounds, bisarene compounds having an amino group (bisarylalkane compounds having an amino group, bisarylsulfone compounds having an amino group, biphenyl compounds having an amino group, and the like), hydroxyarene compounds (hydroxynaphthalene compounds, phenol compounds, and the like), aminoarene compounds (aminonaphthalene compounds, aniline compounds (aminobenzenesulfonic acid, alkylaminobenzenesulfonic acid, and the like), and the like), and the like are preferable. The aromatic compound may further have a substituent. The organic expander may contain one or more or a plurality of residues of these compounds. As the bisphenol compound, bisphenol A, bisphenol S, bisphenol F, and the like are preferable.

The condensate preferably contains a unit of an aromatic compound having at least a sulfur-containing group. In particular, when a condensate containing at least a unit of a bisphenol compound having a sulfur-containing group is used, an effect of suppressing deterioration of low temperature HR discharge performance after high temperature light load test can be enhanced. From the viewpoint of enhancing the effect of suppressing liquid decrease, it is preferable to use a condensate of a naphthalene compound having a sulfur-containing group and having a hydroxy group and/or an amino group with an aldehyde compound.

The sulfur-containing group may be directly bonded to the aromatic ring contained in the compound, and for example, may be bonded to the aromatic ring as an alkyl chain having a sulfur-containing group. The sulfur-containing group is not particularly limited, and examples thereof include a sulfonyl group, a sulfonic acid group or a salt thereof, and the like.

In addition, as the organic expander, for example, at least a condensate containing at least one selected from the group consisting of units of the bisarene compound and units of a monocyclic aromatic compound (hydroxyarene compound and/or aminoarene compound, or the like) may be used. The organic expander may contain at least a condensate containing a unit of a bisarene compound and a unit of a monocyclic aromatic compound (among them, hydroxyarene compound). Examples of such a condensate include a condensate of a bisarene compound and a monocyclic aromatic compound with an aldehyde compound. As the hydroxyarene compound, a phenol sulfonic acid compound (phenol sulfonic acid, a substituted product thereof, or the like) is preferable. As the aminoarene compound, aminobenzenesulfonic acid, alkylaminobenzenesulfonic acid, and the like are preferable. As the monocyclic aromatic compound, a hydroxyarene compound is preferable.

The content of the organic expander contained in the negative electrode material is, for example, 0.01% by mass or more and may be 0.05% by mass or more. The content of the organic expander is, for example, 1.0% by mass or less and may be 0.5% by mass or less. These lower limit values and upper limit values can be combined arbitrarily.

The content of the organic expander contained in the negative electrode material may be 0.01 to 1.0% by mass, 0.05 to 1.0% by mass, 0.01 to 0.5% by mass, or 0.05 to 0.5% by mass.

(Carbonaceous Material)

As the carbonaceous material contained in the negative electrode material, carbon black, graphite, hard carbon, soft carbon, and the like can be used. Examples of the carbon black include acetylene black, Ketjen black, furnace black, lamp black, and the like. The graphite may be a carbonaceous material including a graphite-type crystal structure and may be either artificial graphite or natural graphite. One kind of carbonaceous material may be used alone, or two or more kinds thereof may be used in combination.

The content of the carbonaceous material in the negative electrode material is, for example, 0.05% by mass or more and may be 0.10% by mass or more. The content of the carbonaceous material is, for example, 5% by mass or less and may be 3% by mass or less. These lower limit values and upper limit values can be combined arbitrarily.

The content of the carbonaceous material in the negative electrode material may be 0.05 to 5% by mass, 0.05 to 3% by mass, 0.10 to 5% by mass, or 0.10 to 3% by mass.

(Barium Sulfate)

The content of barium sulfate in the negative electrode material is, for example, 0.05% by mass or more and may be 0.10% by mass or more. The content of barium sulfate in the negative electrode material is 3% by mass or less and may be 2% by mass or less. These lower limit values and upper limit values can be combined arbitrarily.

The content of barium sulfate in the negative electrode material may be 0.05 to 3% by mass, 0.05 to 2% by mass, 0.10 to 3% by mass, or 0.10 to 2% by mass.

(1) Analysis of Polymer Compound

Prior to analysis, a lead-acid battery after formation is fully charged and then disassembled to obtain a negative electrode plate to be analyzed. The obtained negative electrode plate is washed with water to remove sulfuric acid from the negative electrode plate. The washing with water is performed until it is confirmed that color of a pH test paper does not change by pressing the pH test paper against the surface of the negative electrode plate washed with water. However, the washing with water is performed within two hours. The negative electrode plate washed with water is dried at 60±5° C. in a reduced pressure environment for about six hours. When an attached member is included after drying, the attached member is removed from the negative electrode plate by peeling. Next, the negative electrode material is separated from the negative electrode plate to obtain a sample (hereinafter also referred to as sample A.). Sample A is ground as necessary and subjected to analysis.

(1-1) Qualitative Analysis of Polymer Compound 150.0±0.1 mL of chloroform is added to 100.0±0.1 g of the pulverized sample A, and the mixture is stirred at 20±5° C. for 16 hours to extract a polymer compound. Thereafter, the solid content is removed by filtration. For a chloroform solution in which the polymer compound obtained by the extraction is dissolved or a polymer compound obtained by drying the chloroform solution, information is obtained from an infrared spectroscopic spectrum, an ultraviolet-visible absorption spectrum, an NMR spectrum, LC-MS and/or pyrolysis GC-MS, and the like to specify the polymer compound.

Chloroform is distilled off under reduced pressure from the chloroform solution in which the polymer compound obtained by the extraction is dissolved to recover a chloroform soluble component. The chloroform soluble component is dissolved in deuterated chloroform, and a $^1$H-NMR spectrum is measured under the following conditions. From this $^1$H-NMR spectrum, a peak with a chemical shift in the range of 3.2 ppm or more and 3.8 ppm or less is confirmed. Also, from the peak in this range, the type of the oxy $C_{2-4}$ alkylene unit is specified.

Apparatus: type AL400 nuclear magnetic resonance spectrometer, manufactured by JEOL Ltd.

Observation frequency: 395.88 MHz

Pulse width: 6.30 μs

Pulse repeating time: 74.1411 seconds

Number of integrations: 32

Measurement temperature: room temperature (20 to 35° C.)

Reference: 7.24 ppm

Sample tube diameter: 5 mm

From the $^1$H-NMR spectrum, an integrated value ($V_1$) of the peak at which the chemical shift is present in the range of 3.2 ppm or more and 3.8 ppm or less is determined. In addition, for each of the hydrogen atoms of the —$CH_2$— group and the —CH< group bonded to the oxygen atom bonded to the terminal group of the polymer compound, the sum ($V_2$) of integrated values of peaks in the $^1$H-NMR spectrum is determined. Then, from $V_1$ and $V_2$, a ratio of $V_1$ to the sum of $V_1$ and $V_2$ $(=V_1/(V_1+V_2)\times 100(\%))$ is determined.

When the integrated value of the peak in the $^1$H-NMR spectrum is determined in the qualitative analysis, two points having no significant signal are determined so as to sandwich the corresponding peak in the $^1$H-NMR spectrum, and each integrated value is calculated using a straight line connecting the two points as a baseline. For example, for the peak in which the chemical shift is present in a range of 3.2 ppm to 3.8 ppm, a straight line connecting two points of 3.2 ppm and 3.8 ppm in the spectrum is used as a baseline. For example, for a peak in which the chemical shift is present in a range of more than 3.8 ppm and 4.0 ppm or less, a straight line connecting two points of 3.8 ppm and 4.0 ppm in the spectrum is used as a baseline.

(1-2) Quantitative Analysis of Polymer Compound

An appropriate amount of the chloroform soluble component is dissolved in deuterated chloroform together with tetrachloroethane (TCE) of $m_r$ (g) measured with an accuracy of ±0.0001 g, and a $^1$H-NMR spectrum is measured. An integrated value ($S_a$) of the peak in which the chemical shift is present in the range of 3.2 to 3.8 ppm and an integrated value ($S_r$) of a peak derived from TCE are determined, and mass-based content $C_n$ (ppm) of the polymer compound in the negative electrode material is determined from the following formula.

$$C_n = S_a/S_r \times N_r/N_a \times M_a/M_r \times m_r/m \times 1000000$$

wherein $M_a$ is a molecular weight of a structure showing a peak in a chemical shift range of 3.2 to 3.8 ppm (more specifically, a molecular weight of the repeating structure of oxy $C_{2-4}$ alkylene units), and $N_a$ is the number of hydrogen atoms bonded to a carbon atom of a main chain of the repeating structure. $N_r$ and $M_r$ are the number of hydrogen contained in a molecule of reference substance and the molecular weight of the reference substance, respectively, and m (g) is the mass of an active material used for extraction.

Since the reference substance in this analysis is TCE, $N_r=2$ and $M_r=168$. In addition, m=100.

For example, when the polymer compound is polypropylene glycol, $M_a$ is 58, and $N_a$ is 3. When the polymer compound is polyethylene glycol, $M_a$ is 44, and $N_a$ is 4. In the case of a copolymer, $N_a$ is a value obtained by averaging $N_a$ values of each monomer unit using a molar ratio (mol %) of each monomer unit contained in the repeating structure, and $M_a$ is determined according to the type of each monomer unit.

In the quantitative analysis, the integrated value of the peak in the $^1$H-NMR spectrum is determined using data processing software "ALICE" manufactured by JEOL Ltd.

(1-3) Mn Measurement of Polymer Compound

GPC Measurement of the polymer compound is performed using the following apparatus under the following conditions. Separately, a calibration curve (standard curve) is prepared from a plot of Mn of the standard substance and elution time. The Mn of the polymer compound is calculated based on the standard curve and the GPC measurement result of the polymer compound.

Analysis system: 20A system (manufactured by Shimadzu Corporation)
Column: two columns of GPC KF-805L (manufactured by Shodex) connected in series
Column temperature: 30° C.
Mobile phase: tetrahydrofuran
Flow rate: 1 mL/min.
Concentration: 0.20% by mass
Injection amount: 10 μL
Standard substance: polyethylene glycol (Mn=2,000,000, 200,000, 20,000, 2,000, 200)
Detector: differential refractive index detector (Shodex RI-20111, manufactured by Shodex)

(Positive Electrode Plate)

The positive electrode plate of the lead-acid battery includes a positive current collector and a positive electrode material.

The positive electrode material is held by the positive current collector. The positive electrode material contains a positive active material (lead dioxide or lead sulfate) that exhibits a capacity through a redox reaction. The positive electrode material may contain other additives as necessary. The positive electrode material is obtained by removing the positive current collector from the positive electrode plate.

The positive current collector may be formed by casting lead (Pb) or a lead alloy, or may be formed by processing a lead sheet or a lead alloy sheet. Examples of the processing method include expanding processing and punching processing. It is preferable to use a grid-like current collector as the positive current collector because the positive electrode material is easily supported.

The positive current collector may be formed of pure lead, but when a lead alloy is used, for example, a Pb—Ca-based alloy, a Pb—Sn-based alloy, a Pb—Ca—Sn-based alloy, or the like may be used. The lead alloy may further contain, as an additive element, at least one selected from the group consisting of Ba, Ag, Al, Bi, As, Se, Cu, and the like. The positive current collector may include a surface layer. The surface layer and the inner layer of the positive current collector may have different compositions. The surface layer may be formed in a part of the positive current collector. The surface layer may be formed only on the grid portion, only on the lug portion, or only on the frame rib portion of the positive current collector.

A non-formed positive electrode plate is obtained by filling a positive current collector with a positive electrode paste, and curing and drying the paste. The positive electrode paste is prepared by kneading lead powder, an additive, water, and sulfuric acid. Thereafter, the positive electrode plate is obtained by forming the non-formed positive electrode plate.

The Ca content of the positive current collector or the lead alloy constituting the positive current collector may be, for example, 0 to 0.13% by mass, 0 to 0.13% by mass or less, 0 to 0.07% by mass, or 0 to 0.01% by mass (or less than 0.01% by mass).

The Sn content of the positive current collector or the lead alloy constituting the positive current collector may be, for example, 0 to 3.0% by mass, 0 to 0.5% by mass or less, or 0 to 0.01% by mass (or less than 0.01% by mass). In particular, when the Ca content is less than 0.01% by mass, the Sn content is preferably 0.5% by mass or less and may be less than 0.01% by mass. When the positive current collector contains Ca, corrosion resistance of the alloy constituting the positive current collector is improved by containing Sn. For example, when the positive current collector contains 0.01% by mass or more of Ca, the lower limit of the Sn content of the positive current collector may be 0.5% by mass.

A member such as a mat or a pasting paper may be stuck to the positive electrode plate. Such a member (sticking member) is used integrally with the positive electrode plate and is thus assumed to be included in the positive electrode plate. Also, when the positive electrode plate includes such a member, the positive electrode material is obtained by removing the positive current collector and the sticking member from the positive electrode plate in the paste-type positive electrode plate.

The positive electrode plate can be formed in such a manner that a positive current collector is coated or filled with a positive electrode paste, which is then cured and dried to prepare a non-formed positive electrode plate, and thereafter, the non-formed positive electrode plate is formed. The positive electrode paste is prepared by adding an additive to lead powder as necessary, further adding water and sulfuric acid, and kneading the mixture. At the time of curing, it is preferable to cure the non-formed positive electrode plate at a higher temperature than room temperature and high humidity.

Quantification of Sn and Ca contained in the positive current collector can be analyzed, for example, in accordance with lead separation inductively coupled plasma atomic emission spectroscopy described in JIS H 2105. When analyzing the content of elements contained in the positive current collector of the positive electrode plate taken out from the lead-acid battery, first, vibration is applied to the positive electrode plate to cause the positive electrode material to fall off from the positive current collector, then the positive electrode material remaining around the positive current collector is removed using a ceramic knife, and a part of the positive current collector having metallic luster is collected as a sample. The collected sample is decomposed with tartaric acid and dilute nitric acid to obtain an aqueous solution. Hydrochloric acid is added to the aqueous solution to precipitate lead chloride, and the filtrate was collected by filtration. Sn and Ca concentrations in the filtrate are analyzed by a calibration curve method using an ICP emission spectrophotometer (for example, ICPS-8000 manufactured by Shimadzu Corporation), and converted to the Sn content and the Ca content per mass of the positive current collector.

(Formation)

Formation of the negative electrode plate and the positive electrode plate can be performed, for example, by charging an element in a state where the element including the non-formed negative electrode plate and the non-formed positive electrode plate is immersed in an electrolyte solution containing sulfuric acid in a container of the lead-acid battery. However, the formation may be performed before the lead-acid battery or the element is assembled. Spongy lead is generated in the negative electrode plate and lead dioxide is generated in the positive electrode plate by formation.

(Separator)

The separator may have a sheet shape or may be formed in a bag shape. One sheet-like separator may be disposed between the positive electrode plate and the negative electrode plate. Further, the electrode plate may be disposed so as to be sandwiched by one sheet-like separator in a folded state. In this case, the positive electrode plate sandwiched by the folded sheet-like separator and the negative electrode plate sandwiched by the folded sheet-like separator may be overlapped, or one of the positive electrode plate and the negative electrode plate may be sandwiched by the folded sheet-like separator and overlapped with the other electrode plate. Also, the sheet-like separator may be folded into a bellows shape, and the positive electrode plate and the negative electrode plate may be sandwiched by the bellows-shaped separator such that the separator is interposed therebetween. When the separator folded in a bellows shape is used, the separator may be disposed such that the folded portion is along the horizontal direction of the lead-acid battery (e.g., such that the bent portion may be parallel to the horizontal direction), and the separator may be disposed such that the folded portion is along the vertical direction (e.g., such that the bent portion is parallel to the vertical direction). In the separator folded in the bellows shape, recesses are alternately formed on both main surface sides of the separator. Since the lugs are usually formed on the upper portion of the positive electrode plate and the negative electrode plate, when the separator is disposed such that the folded portions are along the horizontal direction of the lead-acid battery, the positive electrode plate and the negative electrode plate are each disposed only in the recess on one main surface side of the separator (i.e., a double separator is interposed between the adjacent positive and negative plates). When the separator is disposed such that the folded portion is along the vertical direction of the lead-acid battery, the positive electrode plate can be housed in the recess on one main surface side, and the negative electrode plate can be housed in the recess on the other main surface side (i.e., the separator can be interposed singly between the adjacent positive and negative plates). When the bag-shaped separator is used, the bag-shaped separator may house the positive electrode plate or may house the negative electrode plate.

In the present specification, the up-down direction of the plate means the up-down direction of the lead-acid battery in the vertical direction.

(Electrolyte Solution)

The electrolyte solution is an aqueous solution containing sulfuric acid and may be gelled as necessary.

The polymer compound may be contained in the electrolyte solution.

The concentration of the polymer compound in the electrolyte solution may be, for example, 500 ppm or less, 300 ppm or less, or 200 ppm or less on a mass basis. The concentration of the polymer compound in the electrolyte solution may be 1 ppm or more or 5 ppm or more on a mass basis. These upper limit values and lower limit values can be combined arbitrarily.

Regarding the concentration of the polymer compound in the electrolyte solution, chloroform is added to and mixed with a predetermined amount ($m_1$ (g)) of the electrolyte solution taken out from the formed lead-acid battery in a fully charged state, the mixture is allowed to stand to be separated into two layers, and then only the chloroform layer is taken out. After repeating this operation several times, chloroform is distilled off under reduced pressure to obtain a chloroform soluble content. An appropriate amount of the chloroform soluble component is dissolved in deuterated chloroform together with 0.0212±0.0001 g of TCE, and a $^1$H-NMR spectrum is measured. An integrated value ($S_a$) of the peak in which the chemical shift is present in the range of 3.2 to 3.8 ppm and an integrated value ($S_r$) of a peak derived from TCE are determined, and content $C_e$ of the polymer compound in the electrolyte solution is determined from the following formula.

$$C_e = S_a/S_r \times N_r/N_a \times M_a/M_r \times m_r/m_1 \times 1000000$$

wherein $M_a$ and $N_a$ are the same as described above.

The electrolyte solution may contain cations (e.g., metal cations such as sodium ion, lithium ion, magnesium ion, and/or aluminum ion) and/or anions (e.g., anions other than sulfate anions such as phosphate ions) as necessary.

The specific gravity of the electrolyte solution in the lead-acid battery in the fully charged state at 20° C. is, for example, 1.20 or more and may be 1.25 or more. The specific gravity of the electrolyte solution at 20° C. is 1.35 or less and preferably 1.32 or less. These lower limit values and upper limit values can be combined arbitrarily. The specific gravity of the electrolyte solution at 20° C. may be 1.20 or more and 1.35 or less, 1.20 or more and 1.32 or less, 1.25 or more and 1.35 or less, or 1.25 or more and 1.32 or less.

The lead-acid battery can be obtained by a production method including a step of assembling a lead-acid battery by housing a positive electrode plate, a negative electrode plate, and an electrolyte solution in a container. In the assembly process of the lead-acid battery, the separator is usually disposed so as to be interposed between the positive electrode plate and the negative electrode plate. The assembly process of the lead-acid battery may include a step of forming the positive electrode plate and/or the negative electrode plate as necessary after the step of housing the positive electrode plate, the negative electrode plate, and the electrolyte solution in the container. The positive electrode plate, the negative electrode plate, the electrolyte solution, and the separator are each prepared before being housed in the container.

Figure 2A:
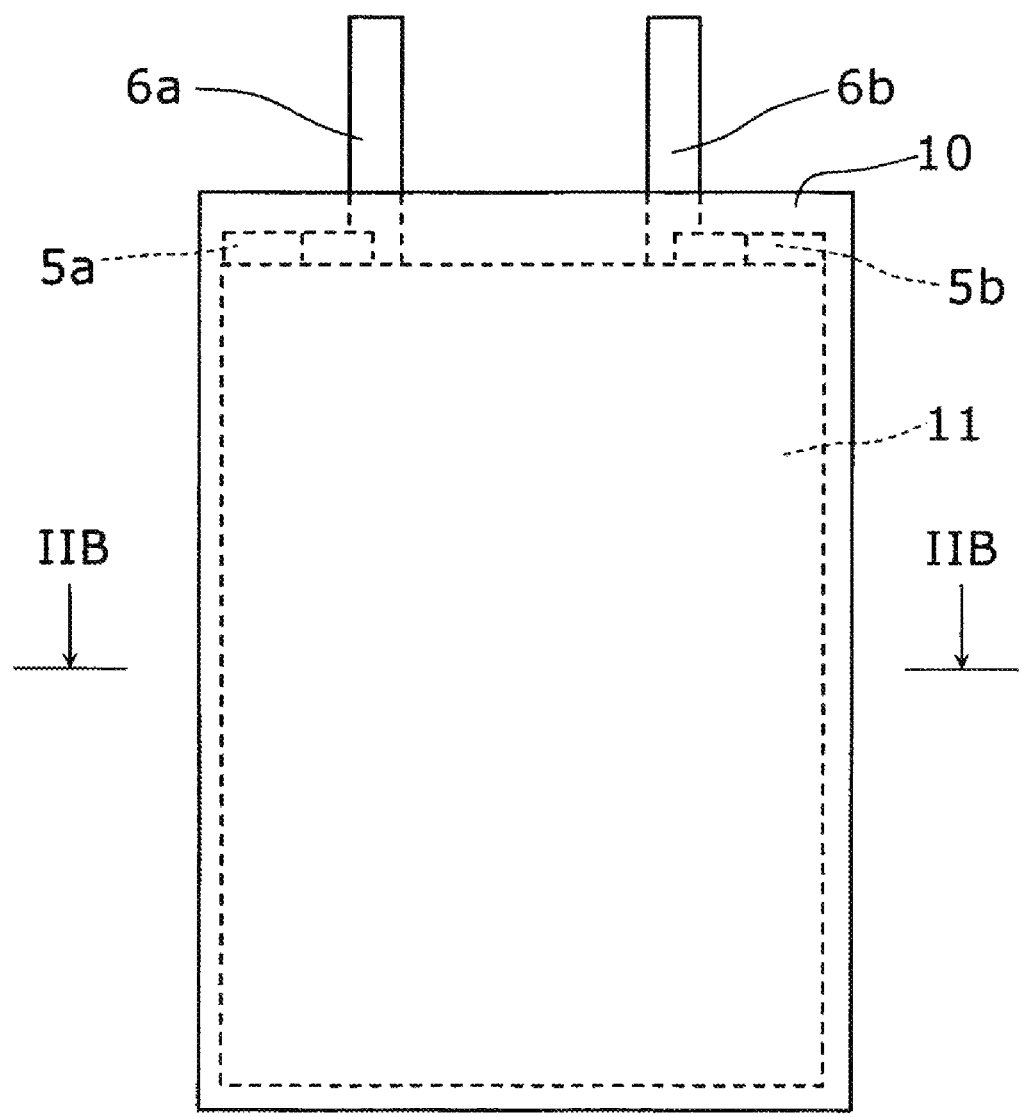
FIG. 2A is a front view of the lead-acid battery in FIG. 1.
Figure 2B:
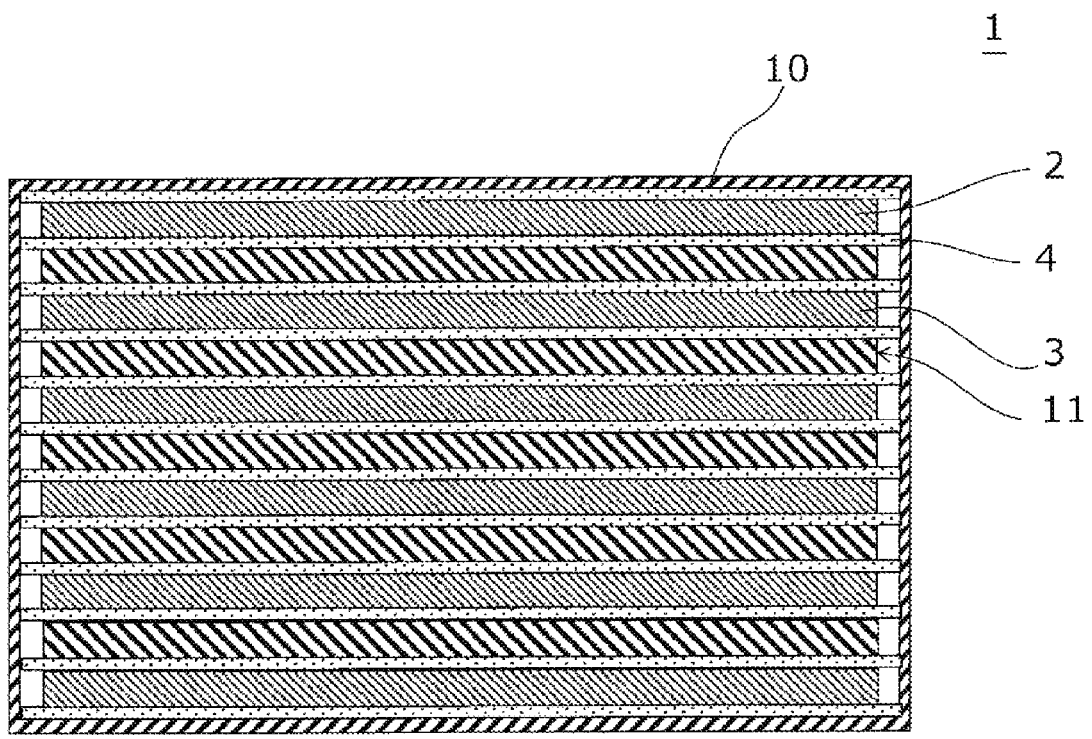
FIG. 2B is a cross-sectional view taken along a line IIB-IIB of the lead-acid battery in FIG. 2A.

FIG. 1 is a perspective view schematically showing an example in which a lid of a lead-acid battery according to an embodiment of the present invention is removed. FIG. 2A is a front view of the lead-acid battery in FIG. 1, and FIG. 2B is a cross-sectional view taken along a line IIB-IIB in FIG. 2A.

A lead-acid battery 1 includes a container 10 that houses an element 11 and an electrolyte solution (not shown). The element 11 is configured by laminating a plurality of negative electrode plates 2 and positive electrode plates 3 with a separator 4 interposed therebetween.

An upper portion of each of the plurality of negative electrode plates 2 is provided with a current collection lug (not illustrated) projecting upward. An upper portion of each of the plurality of positive electrode plates 3 is also provided with a current collection lug (not illustrated) projecting upward. Then, the lugs of the negative electrode plates 2 are connected and integrated with each other by a negative electrode strap 5a. Similarly, the lugs of the positive electrode plates 3 are also connected and integrated with each other by a positive electrode strap 5b. A negative pole 6a is fixed to the negative electrode strap 5a, and a positive pole 6b is fixed to the positive electrode strap 5b.

<Battery Life During High-Temperature Float Charging>

A valve regulated lead-acid battery having a nominal voltage of 2 V and a rated capacity of 50 Ah/10 hr is used as a test battery. In an environment of 60° C.±2° C., float charging is performed under a constant voltage condition of 2.23 V/cell, and 10 hour rate capacity test is performed at 25° C.±2° C. every month. In the 10 hour rate capacity test, the test battery is discharged at a current (A) of 0.1 times the numerical value described as the rated capacity (Ah) until the voltage reaches 1.8 V/cell, and then recovery charging of an amount of electricity of 120% with respect to the discharge capacity is performed. A test period until the battery capacity reaches 80% or less of the rated capacity is defined as a life period. By multiplying the lifetime at 60° C. by a predetermined index, the life period can be converted into lifetime at 25° C. The standard is as follows.

Life period at 60° C. of 12 months or more: expected life at 25° C. of 11 to 12 years Life period at 60° C. of 16 months or more: expected life at 25° C. of 15 years or more Life period at 60° C. of 22 months or more: expected life at 25° C. of 20 years or more (a) Amount of Overcharge The total amount of charge when high-temperature float charging of 2.23 V/cell was performed for 1 month is measured.

(b) Corrosion Amount of Positive Current Collector

The test battery is subjected to high temperature float charging for 1 month, 8 months or 11 months. Thereafter, the lead-acid battery is disassembled, the positive current collector is taken out from the positive electrode plate, the positive electrode plate is cut with the vicinity of the center in the vertical direction as a boundary, a cut surface is then polished, a cross-sectional area of a portion having metallic luster in the polished cross section is measured, and a difference from the cross-sectional area of the positive current collector before the test is calculated as a corrosion amount in percentage.

(c) Lead Sulfate Accumulation Amount

The test battery is subjected to high temperature float charging for 1 month, 8 months or 11 months. Thereafter, the lead-acid battery is disassembled, electrode materials are taken out from the positive electrode plate and the negative electrode plate, the amount of sulfur (S) element per total mass of each electrode material is measured with a sulfur analyzer, and the amount of S element is converted into a mass of $PbSO_4$ and calculated as a percentage with respect to the total mass of each electrode material.

(d) Solution Decrease Rate

The test battery is subjected to high temperature float charging for 1 month, 8 months, or 11 months. Thereafter, the amount of decrease in mass of the test battery before and after the test is measured, and a difference between the amount of decrease in mass and the mass of the electrolyte solution contained in the test battery before the test is calculated as a solution decrease rate in percentage.

The results of the above (a) to (d) are converted into degradation degrees based on the following indicators.

TABLE A

| Degradation degree | Corrosion amount of positive current collector | Lead sulfate accumulation amount of positive electrode | Lead sulfate accumulation amount of negative electrode | Solution decrease rate |
|---|---|---|---|---|
| 1 | 0 to less than 13% by mass | 0 to less than 5% by mass | 0 to less than 8% by mass | 0 to less than 3% by mass |
| 2 | 13 to less than 25% by mass | 5 to less than 10% by mass | 8 to less than 16% by mass | 3 to less than 7% by mass |
| 3 | 25 to less than 38% by mass | 10 to less than 15% by mass | 16 to less than 24% by mass | 7 to less than 11% by mass |
| 4 | 38 to less than 50% by mass | 15 to less than 20% by mass | 24 to less than 32% by mass | 11 to less than 15% by mass |
| 5 | 50% by mass or more | 20% by mass or more | 32% by mass or more | 15% by mass or more |

The lead-acid battery according to one aspect of the present invention will be described below.

(1) A lead-acid battery including a positive electrode plate, a negative electrode plate, an electrolyte solution, and a polymer compound, in which
the positive electrode plate includes a positive current collector and a positive electrode material,
the negative electrode plate includes a negative current collector and a negative electrode material,
the Ca content of the positive current collector is 0.13% by mass or less, and
the polymer compound has a peak in a range of 3.2 ppm or more and 3.8 ppm or less in a chemical shift of $^1$H-NMR spectrum.

(2) In the above (1), the Ca content of the positive current collector may be, for example, 0.07% by mass or less.

(3) In the above (1) or (2), the Ca content of the positive current collector may be, for example, less than 0.01% by mass, and the Sn content may be, for example, 0.5% by mass or less.

(4) In the above (1) to (3), the Ca content of the positive current collector may be, for example, less than 0.01% by mass, and the Sn content may be, for example, less than 0.01% by mass.

(5) In any one of the above (1) to (4), when at least the negative electrode material contains the polymer compound, the content of the polymer compound in the negative electrode material may be, for example, 400 ppm or less in mass ratio.

(6) In the above (5), the content of the polymer compound in the negative electrode material may be, for example, 5 ppm or more in mass ratio.

(7) A lead-acid battery including a positive electrode plate, a negative electrode plate, an electrolyte solution, and a polymer compound, in which
the positive electrode plate includes a positive current collector and a positive electrode material,
the negative electrode plate includes a negative current collector and a negative electrode material,
the Ca content of the positive current collector is 0.13% by mass or less, and
the polymer compound contains a repeating structure of oxy $C_{2-4}$ alkylene units.

(8) In the above (7), the Ca content of the positive current collector may be, for example, 0.07% by mass or less.

(9) In the above (7) or (8), the Ca content of the positive current collector may be, for example, less than 0.01% by mass, and the Sn content may be, for example, 0.5% by mass or less.

(10) In the above (7) to (9), the Ca content of the positive current collector may be, for example, less than 0.01% by mass, and the Sn content may be, for example, less than 0.01% by mass.

(11) In any one of the above (7) to (10), when at least the negative electrode material contains the polymer compound, the content of the polymer compound in the negative electrode material may be, for example, 400 ppm or less in mass ratio.

(12) In the above (11), the content of the polymer compound in the negative electrode material may be, for example, 5 ppm or more in mass ratio.

(13) In any one of the above (1) to (12), the lead-acid battery may be a valve regulated lead-acid battery.

Hereinafter, the present invention will be specifically described on the basis of examples and comparative examples, but the present invention is not limited to the following examples.

<<Lead-Acid Batteries A1 to A7 and R1 to R6>>

(1) Preparation of Lead-Acid Battery

Using a negative electrode material having a polypropylene glycol (PPG) content and a positive current collector having a Ca content and a Sn content shown in the following Table 1, lead-acid batteries A1 to A7 and R1 to R6 were assembled in the manner of the following (a) to (c). A1 to A7 correspond to Examples, and R1 to R6 correspond to Comparative Examples.

(a) Preparation of Negative Electrode Plate

Lead powder as raw material, barium sulfate, carbon black, a polymer compound (polypropylene glycol (PPG), Mn=1500), and an organic expander (sodium lignin sulfonate) are mixed with an appropriate amount of a sulfuric acid aqueous solution to obtain a negative electrode paste. At this time, the components are mixed so that the content of the polymer compound in the negative electrode material, which is determined by the procedure described above, is the value shown in Table 1, the content of barium sulfate is 1.5% by mass, the content of carbon black is 0.3% by mass, and the content of the organic expander is 0.1% by mass. A mesh portion of a cast grid made of a Pb—Ca—Sn alloy which is a negative current collector is filled with the negative electrode paste, which is then cured and dried to obtain a non-formed negative electrode plate.

(b) Preparation of Positive Electrode Plate

Lead powder as raw material is mixed with a sulfuric acid aqueous solution to obtain a positive electrode paste. A mesh portion of a cast grid made of a Pb—Ca—Sn alloy or the like is filled with the positive electrode paste, which is then cured and dried to obtain a non-formed positive electrode plate. The Ca content and the Sn content of the positive current collector (that is, a Pb—Ca—Sn alloy or the like herein) determined by the procedure described above are the values shown in Table 1.

(c) Preparation of Test Battery

A valve regulated lead-acid battery having a nominal voltage of 2 V and a rated capacity of 50 Ah/10 hr is prepared. An element of the test battery includes five positive electrode plates and six negative electrode plates sandwiching the positive electrode plates. A positive electrode plate and a negative electrode plate are laminated with a glass fiber nonwoven fabric separator interposed therebetween to form an element. The element is housed in a polypropylene container together with an electrolyte solution (sulfuric acid aqueous solution), and subjected to formation in the container to prepare a flooded-type lead-acid battery. The specific gravity of the electrolyte solution after formation is 1.28 (in terms of 20° C.).

In the $^1$H-NMR spectrum of the polymer compound measured by the procedure described above, a peak derived from —CH< of the oxypropylene unit is observed in a chemical shift range of 3.2 ppm or more and 3.42 ppm or less, and a peak derived from —CH$_2$— of the oxypropylene unit is observed in a chemical shift range of more than 3.42 ppm and 3.8 ppm or less. In addition, in the $^1$H-NMR spectrum, a ratio of an integrated value of the peak of 3.2 ppm to 3.8 ppm to the sum of the integrated value of this peak, an integrated value of a peak of hydrogen atoms of the —$CH_2$— group bonded to the oxygen atom, and an integrated value of a peak of a hydrogen atom of the —CH< group bonded to the oxygen atom is 98.1%.

(2) Evaluation

Using the lead-acid battery, a high-temperature float charge test was conducted by the method described above. The battery life and the results of the overcharge test in the first month are shown in Tables 1 and 2.

TABLE 1

|  | R1 | R2 | R3 | R4 | R5 | R6 |
|---|---|---|---|---|---|---|
| Ca Content [%] | 0.01> | 0.01> | 0.07 | 0.13 | 0.17 | 0.17 |
| Sn Content [%] | 0.01> | 0.5 | 2 | 2 | 2 | 2 |
| Polymer compound content [ppm] | 0 | 0 | 0 | 0 | 0 | 200 |
| Amount of overcharge (first month) Rh | 23 | 24 | 25 | 26 | 27 | 21 |
| Life period [month] | 8 | 16 | 15 | 11 | 8 | 8 |

In Table 1, in batteries R5 and R6 in which the Ca content in the positive current collector is more than 0.13% by mass and 0.17% by mass, the life period is as short as 8 months regardless of the presence or absence of the polymer compound. However, the amount of overcharge of the battery R6 in which the negative electrode material contains the polymer compound in the first month is significantly lower than that of the battery R5. These results indicate that when the Ca content is more than 0.13% by mass, the polymer compound does not affect the life during float charging. In addition, this generally indicates that corrosion of the positive current collector determines the life of the valve regulated lead-acid battery. On the other hand, in batteries R1 to R4, the life period is remarkably improved as the Ca content decreases. When comparing the batteries R1 to R4 having a Ca content of 0.13% by mass or less, the life period is increased from 11 months to 18 months by 7 months. In addition, the life period is further extended by reducing the Sn content as the Ca content is reduced.

TABLE 2

|  | A1 | A2 | A3 | A4 | A5 | A6 | A7 |
|---|---|---|---|---|---|---|---|
| Ca Content [%] | 0.01> | 0.01> | 0.01> | 0.01> | 0.01> | 0.07 | 0.13 |
| Sn Content [%] | 0.01> | 0.01> | 0.01> | 0.01> | 0.5 | 2 | 2 |
| Polymer compound content [ppm] | 15 | 200 | 250 | 400 | 200 | 200 | 200 |
| Amount of overcharge (first month) [Ah] | 20 | 17 | 16 | 13 | 18 | 19 | 19 |
| Life period [month] | 25 | 27 | 25 | 15 | 22 | 17 | 13 |

Next, when comparing the batteries A2, A5 to A7 in which the negative electrode material contains the polymer compound in an amount of 200 ppm, the life period is increased from 13 months to 27 months by 14 months. That is, the degree of improvement in the life period is remarkable due to the presence of the polymer compound. More specifically, when comparing the batteries R4 and A7 having a Ca content of 0.13% by mass, there is a difference of 2 months in the life period (11 months in R4 and 13 months in A7) depending on the presence or absence of the polymer compound. In addition, when comparing the batteries R3 and A6 having a Ca content of 0.07% by mass, there is a difference of 2 months in the life period (15 months in R3 and 17 months in A6) depending on the presence or absence of the polymer compound. On the other hand, when comparing the batteries R2 and A5 having a Ca content of less than 0.01% by mass, there is a difference of 6 months in the life period (16 months in R2 and 22 months in A5) depending on the presence or absence of the polymer compound, and similarly, when comparing the batteries R1 and A2 having a Ca content of less than 0.01% by mass, there is a difference of 9 months in the life period (18 months in R1 and 27 months in A2) depending on the presence or absence of the polymer compound. Such a remarkable extension of the life period is an effect peculiar to the case of using a positive current collector having a low Ca content and high corrosion resistance and using a polymer compound.

Next, the results of the float charge test in the eighth month are shown in Tables 3 and 4.

TABLE 3

| Eighth month | R1 | R2 | R3 | R4 | R5 | R6 |
|---|---|---|---|---|---|---|
| Ca Content [%] | 0.01> | 0.01> | 0.07 | 0.13 | 0.17 | 0.17 |
| Sn Content [%] | 0.01> | 0.5 | 2 | 2 | 2 | 2 |
| Polymer compound content [ppm] | 0 | 0 | 0 | 0 | 0 | 200 |
| Corrosion amount of current collector | 1 | 2 | 3 | 4 | 5 | 5 |
| Lead sulfate accumulation amount of positive electrode | 1 | 1 | 1 | 1 | 1 | 1 |
| Lead sulfate accumulation amount of negative electrode | 1 | 1 | 1 | 1 | 1 | 1 |
| Solution decrease rate | 3 | 3 | 3 | 3 | 3 | 2 |

Table 3 shows that when the polymer compound is not used, the corrosion of the positive current collector has a very large influence on the battery life. In addition, it is found that as the Ca content of the positive current collector is reduced, the influence of corrosion of the positive current collector is gradually reduced, and as a result, the influence of electrolyte solution decrease can be relatively increased.

TABLE 4

| Eighth month | A1 | A2 | A3 | A4 | A5 | A6 | A7 |
|---|---|---|---|---|---|---|---|
| Ca Content [%] | 0.01> | 0.01> | 0.01> | 0.01> | 0.01> | 0.07 | 0.13 |
| Sn Content [%] | 0.01> | 0.01> | 0.01 | 0.01> | 0.5 | 2 | 2 |
| Polymer compound content [ppm] | 15 | 200 | 250 | 400 | 200 | 200 | 200 |
| Corrosion amount of current collector | 1 | 1 | 1 | 1 | 1 | 2 | 4 |
| Lead sulfate accumulation amount of positive electrode | 1 | 2 | 2 | 4 | 2 | 2 | 1 |
| Lead sulfate accumulation amount of negative electrode | 1 | 1 | 1 | 1 | 1 | 1 | 1 |
| Solution decrease rate | 2 | 2 | 2 | 2 | 2 | 2 | 2 |

Table 4 shows that when a polymer compound is used, the corrosion amount of the positive current collector tends to be reduced, and the solution decrease rate of the electrolyte solution tends to decrease. In addition, based on the results of Tables 1 and 2, it is suggested that the solution decrease rate of the electrolyte solution has a large influence on the battery life. It can be understood that when the amount of the polymer compound of the negative electrode material is 400 ppm, accumulation of lead sulfate in the positive electrode plate becomes remarkable. This is understood to be because the charge current during float charging is lower than the self-discharge rate of the positive electrode material.

Next, the results of the overcharge test in the eleventh month are shown in Tables 5 and 6.

TABLE 5

| Eleventh month | R1 | R2 | R3 | R4 |
|---|---|---|---|---|
| Ca Content [%] | 0.01> | 0.01> | 0.07 | 0.13 |
| Sn Content [%] | 0.01> | 0.5 | 2 | 2 |
| Polymer compound content [ppm] | 0 | 0 | 0 | 0 |
| Corrosion amount of current collector | 2 | 3 | 4 | 5 |
| Lead sulfate accumulation amount of positive electrode | 1 | 1 | 1 | 1 |
| Lead sulfate accumulation amount of negative electrode | 1 | 1 | 1 | 1 |
| Solution decrease rate | 4 | 4 | 4 | 4 |

Table 5 shows that when the polymer compound is not used, both the corrosion of the positive current collector and the electrolyte solution decrease become remarkable. In addition, it is found that as the Ca content of the positive current collector is reduced, the influence of corrosion of the positive current collector is gradually reduced, and as a result, the influence of electrolyte solution decrease can be relatively increased.

TABLE 6

| Eleventh month | A1 | A2 | A3 | A4 | A5 | A6 | A7 |
|---|---|---|---|---|---|---|---|
| Ca Content [%] | 0.01> | 0.01> | 0.01> | 0.01> | 0.01> | 0.07 | 0.13 |
| Sn Content [%] | 0.01> | 0.01> | 0.01> | 0.01> | 0.5 | 2 | 2 |
| Polymer compound content [ppm] | 15 | 200 | 250 | 400 | 200 | 200 | 200 |
| Corrosion amount of current collector | 2 | 2 | 2 | 2 | 2 | 3 | 5 |
| Lead sulfate accumulation amount of positive electrode | 1 | 2 | 2 | 4 | 2 | 2 | 1 |
| Lead sulfate accumulation amount of negative electrode | 1 | 1 | 1 | 1 | 1 | 1 | 1 |
| Solution decrease rate | 3 | 2 | 2 | 2 | 2 | 2 | 2 |

Table 6 also shows that when a polymer compound is used, the corrosion amount of the positive current collector tends to be reduced, and the solution decrease rate of the electrolyte solution tends to decrease, and in particular, reduction in the solution decrease rate is remarkable. Based on the results of Tables 1 and 2, it is considered that the reduction in the solution decrease rate of the electrolyte solution is greatly involved in the remarkable improvement in the life period when the Ca content is low.

INDUSTRIAL APPLICABILITY

The lead-acid battery according to the present invention can be applied to, for example, a valve regulated lead-acid battery, and specifically, can be used for a stationary industrial energy storage apparatus, a power source for starting a vehicle, a power source for auxiliary machine, or the like. Note that these applications are merely illustrative and not limited to these applications.

DESCRIPTION OF REFERENCE SIGNS

1: Lead-acid battery
2: Negative electrode plate
3: Positive electrode plate
4: Separator
5a: Negative electrode strap
5b: Positive electrode strap
6a: Negative pole
6b: Positive pole
10: Container
11: Element

The invention claimed is:

1. A lead-acid battery comprising a positive electrode plate, a negative electrode plate, an electrolyte solution, and a polymer compound, wherein
   the positive electrode plate includes a positive current collector and a positive electrode material,
   the negative electrode plate includes a negative current collector and a negative electrode material, wherein at least the negative electrode material contains the polymer compound,
   the Ca content of the positive current collector is 0.13% by mass or less, and
   the polymer compound has a peak in a range of 3.2 ppm or more and 3.8 ppm or less in a chemical shift of $^1$H-NMR spectrum, and the polymer compound contains a repeating structure of oxy C2-4 alkylene units.

2. The lead-acid battery according to claim 1, wherein the Ca content of the positive current collector is 0.07% by mass or less.

3. The lead-acid battery according to claim 2, wherein the Ca content of the positive current collector is less than 0.01% by mass.

4. The lead-acid battery according to claim 3, wherein the positive current collector has a Sn content of 0.5% by mass or less.

5. The lead-acid battery according to claim 4, wherein the positive current collector has a Sn content of less than 0.01% by mass.

6. The lead-acid battery according to claim 1,
   a content of the polymer compound in the negative electrode material is 400 ppm or less in mass ratio.

7. The lead-acid battery according to claim 6, wherein a content of the polymer compound in the negative electrode material is 5 ppm or more in mass ratio.

8. A lead-acid battery comprising a positive electrode plate, a negative electrode plate, an electrolyte solution, and a polymer compound, wherein
   the positive electrode plate includes a positive current collector and a positive electrode material,
   the negative electrode plate includes a negative current collector and a negative electrode material, wherein at least the negative electrode material contains the polymer compound,
   the Ca content of the positive current collector is 0.13% by mass or less, and
   the polymer compound contains a repeating structure of oxy $C_{2-4}$ alkylene units.

9. The lead-acid battery according to claim 8, wherein the Ca content of the positive current collector is 0.07% by mass or less.

10. The lead-acid battery according to claim 9, wherein the Ca content of the positive current collector is less than 0.01% by mass.

11. The lead-acid battery according to claim 10, wherein the positive current collector has a Sn content of 0.5% by mass or less.

12. The lead-acid battery according to claim 11, wherein the positive current collector has a Sn content of less than 0.01% by mass.

13. The lead-acid battery according to claim 8,
   a content of the polymer compound in the negative electrode material is 400 ppm or less in mass ratio.

14. The lead-acid battery according to claim 13, wherein a content of the polymer compound in the negative electrode material is 5 ppm or more in mass ratio.

15. The lead-acid battery according to claim 1, which is a valve regulated lead-acid battery.

16. The lead-acid battery according to claim 8, which is a valve regulated lead-acid battery.

* * * * *